(12) United States Patent
Trinh

(10) Patent No.: US 9,884,583 B2
(45) Date of Patent: Feb. 6, 2018

(54) METHOD AND APPARATUS FOR OPERATING A SIGNAL SYSTEM, SIGNAL SYSTEM, VEHICLE

(71) Applicant: Robert Bosch GmbH, Stuttgart (DE)

(72) Inventor: Hoang Trinh, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/491,253

(22) Filed: Apr. 19, 2017

(65) Prior Publication Data

US 2017/0334348 A1    Nov. 23, 2017

(30) Foreign Application Priority Data

May 17, 2016   (DE) .......................... 10 2016 208 410

(51) Int. Cl.
*B60Q 1/34*        (2006.01)
*G06F 3/01*        (2006.01)

(52) U.S. Cl.
CPC ............. *B60Q 1/343* (2013.01); *G06F 3/012* (2013.01); *G06F 3/013* (2013.01)

(58) Field of Classification Search
CPC ...... B65G 69/181; B65G 11/00; B65G 15/00; B65G 53/24; B65G 65/42; E21B 41/00; E21B 43/267
USPC ........................................ 340/475, 434, 901
See application file for complete search history.

(56) References Cited

U.S. PATENT DOCUMENTS

| | | | |
|---|---|---|---|
| 2005/0200467 A1* | 9/2005 | Au ........................... | B60Q 1/34 340/465 |
| 2008/0061958 A1* | 3/2008 | Birk ......................... | B60Q 9/00 340/517 |
| 2009/0189756 A1* | 7/2009 | Wu .......................... | B60Q 1/34 340/475 |
| 2014/0121897 A1* | 5/2014 | Felkins ................. | B60W 50/14 701/36 |
| 2015/0293586 A1* | 10/2015 | Kritt ....................... | G06T 11/60 345/158 |

FOREIGN PATENT DOCUMENTS

DE        102012023108 A1    6/2014

\* cited by examiner

*Primary Examiner* — Ojiako Nwugo
(74) *Attorney, Agent, or Firm* — Norton Rose Fulbright US LLP; Gerard Messina

(57) ABSTRACT

A method for operating a signal system, in particular for a vehicle, a gaze direction of a user being monitored by way of at least one first sensor, a warning signal being outputted depending on the gaze direction detected. Provision is made that by way of at least one second sensor, an environment of the user is monitored for possible target objects, the detected gaze direction of the user being compared with the environment. When the gaze direction of the user points toward one of the possible target objects, that target object is designated as a selected target object and, depending on a triggering command of the user, the warning signal is outputted into the environment for the selected target object.

12 Claims, 3 Drawing Sheets

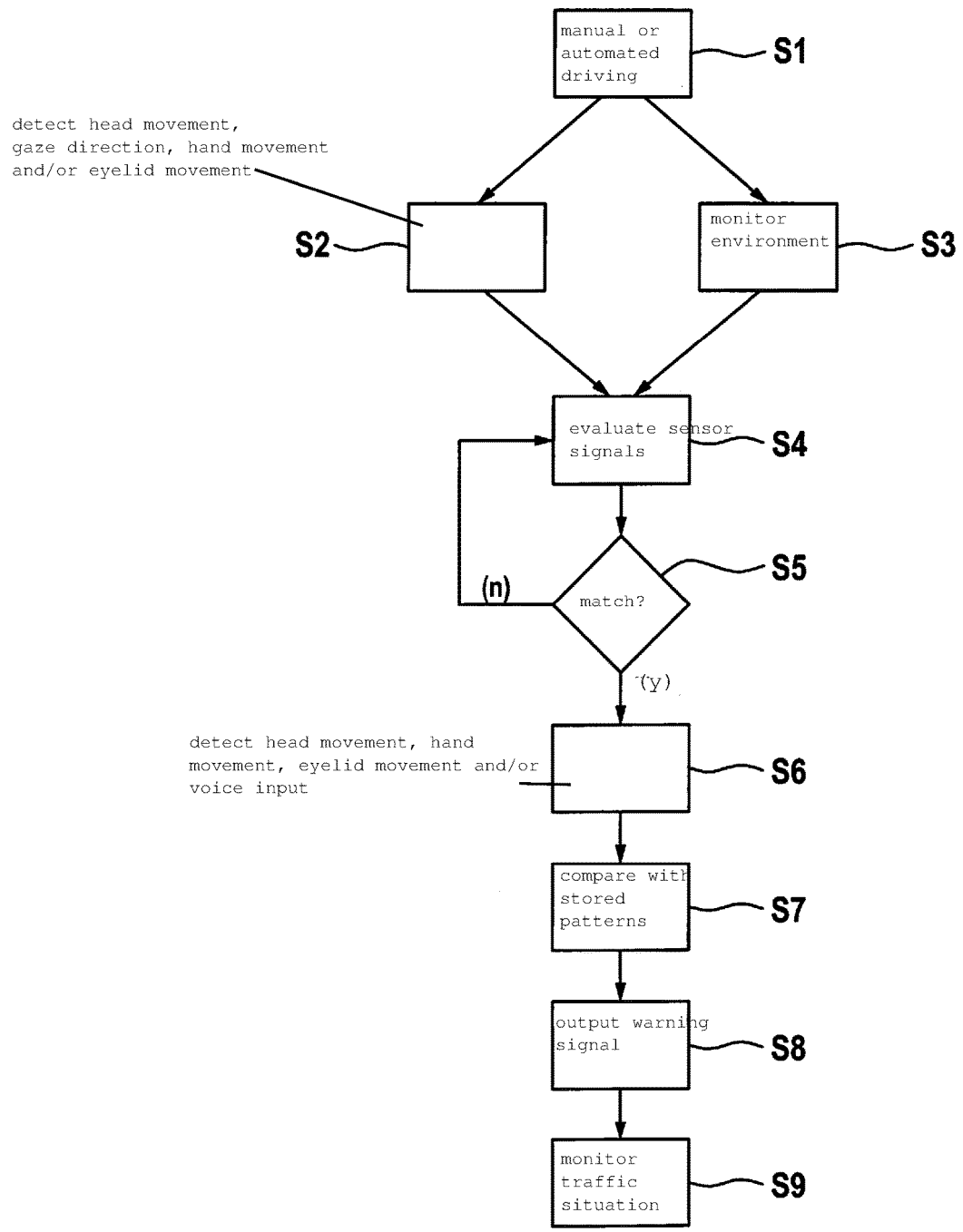

METHOD AND APPARATUS FOR OPERATING A SIGNAL SYSTEM, SIGNAL SYSTEM, VEHICLE

CROSS REFERENCE

The present application claims the benefit under 35 U.S.C. §119 of German Patent Application No. DE 102016208410.0 filed on May 17, 2016, which is expressly incorporated herein by reference in its entirety.

FIELD

The present invention relates to a method for operating a signal system, in particular for a vehicle, a gaze direction of a user being monitored by way of at least one first sensor, and a warning signal being outputted depending on the gaze direction detected.

The present invention further relates to an apparatus for operating the signal system, to a signal system, and to a vehicle having such a signal system.

BACKGROUND INFORMATION

German Patent Application No. DE 10 2012 023 108 A1 describes, for example, a method for operating a signal system which recognizes a lane change intention of a driver of a motor vehicle and wirelessly conveys or reports that lane change intention to other motor vehicles. The lane change intention is ascertained by way of image data of the driver acquired by an interior camera. The image data are evaluated for that purpose, for example, in terms of mirror gazes and/or over-the-shoulder gazes performed by the driver. If a lane change intention is recognized from the driver's head motion detected in that context, a warning signal in the form of a lane change intention is then conveyed to other motor vehicles in the environment of the driver so that they can react promptly to the driver's lane change.

SUMMARY

Provision is made according to the present invention that by way of at least one second sensor, an environment of the user is monitored for possible target objects, the detected gaze direction of the user being compared with the environment; and when the gaze direction of the user points toward one of the possible target objects, that target object is designated as a selected target object and, depending on a triggering command of the user, the warning signal is outputted into the environment for the selected target object. The example method according to the present invention may have the advantage that the user communicates with a target object in simple fashion and in particular makes it aware of him or her. The user is given the capability of outputting a notification to the environment by selecting a target object from the environment by way of the detected gaze direction of the user and by way of a triggering command given, in particular, manually or in noncontact fashion. Because the notification or the warning signal is outputted only when a target object has been detected, incorrect operation of the triggering command, and thus undesired output of the warning signal, are avoided. If the user is a driver of a vehicle, for example, and if the driver is in a traffic situation in which he or she wishes to grant priority to a pedestrian who wishes to cross a street, the driver can then signal to the pedestrian by way of a gesture, for example a hand gesture, that he or she is granting him or her priority. The warning signal that makes the pedestrian aware of the driver and his or her gesture is triggered even when the pedestrian cannot see, or has not yet seen, the driver him- or herself.

According to a preferred refinement of the present invention, provision is made that a head movement, hand movement, eyelid movement, and/or voice input of the user is detected in noncontact fashion as a triggering command. The advantage here is that the output of a warning signal to the environment occurs in response to a noncontact command. A distraction of the user which occurs when he or she him- or herself triggers the output of the warning signal by way of a manual activity is thus avoided. A nod that the user executes toward the target object is detected as a head movement. A wave, for example, is detected as a hand movement, the hand being moved, for example, from right to left in order to trigger the warning signal. Alternatively or additionally, the driver can close at least one of his or her eyelids in the direction of the target object, for example, twice within a predefinable time, and thus wink toward the target object in order to trigger the warning signal. It is likewise possible for the user to say a predefinable word, for example "yes" or "stop," directed at the target object in order to trigger the warning signal. Alternatively, a triggering command that is effected, for example, by way of a manual actuation of a switch or pushbutton of an, in particular, touch-sensitive operating surface, for example the operating surface of a combination instrument of the vehicle, is detected.

According to a preferred refinement of the present invention, provision is made that a warning signal is outputted when a nod and/or a head shake is detected as a head movement of the user. The advantage of this embodiment is that the warning signal is outputted on the basis of simple and intuitive head movements. Nodding is generally considered a sign of affirmation, head shaking as a sign of refusal. Provision is therefore preferably made that an affirming warning signal is outputted upon a nod, and a refusing warning signal upon a head shake. In particular, a first input command is therefore recognized when nodding is detected as a movement, and a second input command is recognized when head shaking is detected as a movement. It is thus possible for the first input command to signal that priority is granted, while the second input command signals that the user/driver is him- or herself claiming priority. An algorithm in which nodding or head shaking is respectively stored as a movement pattern, and is compared with the detected head movement, preferably serves for evaluation of the head movement. Preferably the number of nodding movements and/or head-shaking movements is detected, for example in order to adapt the warning signal thereafter. A camera, in particular an interior camera, whose image data are correspondingly evaluated, is preferably used as a sensor. In order to detect the head movement and/or gaze direction, in particular movement trajectories of the head and/or eyes of the driver are detected and are compared with predetermined movement patterns in order to recognize a corresponding head movement and/or eye movement. Detection of a gaze direction of a driver is conventional, and will therefore not be discussed in detail at this point. Essentially, the gaze direction is determined depending on the position of the pupils.

Particularly preferably, provision is made that the warning signal is outputted acoustically, optically, and/or electronically. By way of the acoustic warning signal the target object, in particular a further traffic participant, is made aware of the driver or of the user of the signal system even when he or she is not him- or herself looking toward the user. The same also applies to the optical warning signal that makes the receiver or the target object aware of the user. By way of the electronic warning signal, which is outputted in particular by way of a vehicle-to-vehicle communication, other traffic participants in particular are made aware of the user even if they themselves, for example, cannot perceive an acoustic or optical warning message that is outputted by the signal system of the user, for example because they are located in their enclosed passenger compartment. The electronic warning signal can, however, be evaluated by the receiver or the selected target object if what is involved is a corresponding vehicle, so that actions or reactions to the user's notification can be triggered promptly. By way of the warning signal, a signal is given to the target object that it needs to take an action in coordination with the user. A horn sound serves, for example, as an acoustic warning signal. A headlight flash or a projection of a projection pattern onto a road serves, for example, as an optical warning signal. It is also conceivable to output the warning signal to the environment in the form of a traffic signal or by way of an electronic display screen. Electronic output of the warning signal to the selected target object is accomplished in particular by way of a vehicle-to-vehicle communication. For example, if the user is driving in a vehicle in a fast lane of an expressway, and if that user recognizes that a vehicle in front of him or her wishes to change into the fast lane, that vehicle is then selected as a target object and the user can notify the vehicle, for example by a nod and/or a predetermined hand movement, that it can safely change into the lane. In particular, the warning signal is forwarded in wireless electronic fashion, for example via radio, to the other traffic participant constituting a selected target object. The conveyed warning signal is presented to the driver of the preceding vehicle, for example, on the display of a combination instrument. Manual actuation of the horn and/or headlights, which serves, e.g., to output the warning signal and could irritate other traffic participants, is thus avoided.

Preferably the warning signal is outputted in directed fashion toward the target object that is selected or designated by way of the gaze direction of the user. The advantage here is that the target object is unequivocally given to understand that the warning signal is directed toward that target object. For example, if a pedestrian is respectively present on both sides of the street at a pedestrian crossing, and if the pedestrian on the right side of the street is selected as a target object, the warning signal is conveyed in directed fashion to him or her. For example, only a single headlight is flashed, in particular the headlight located closer to the selected target object/pedestrian; or an animation of, for example, a crosswalk pattern, which moves toward the target object in directed fashion along the street, is projected.

According to a preferred refinement, provision is made that different warning signals are outputted depending on the triggering command detected. For example, upon a nod the projection of a crosswalk pattern is projected to a pedestrian onto the roadway; upon a wave with the hand, a horn sound is outputted; and upon a spoken "yes" the low-beam headlight is activated. Stored movement profiles and typical head movements and/or hand movements are accessed in order to determine a corresponding warning signal from a head movement and/or hand movement. It is also possible to create, by repeated use, a movement profile of the user or of the driver of the vehicle, and to store it, in order to ascertain specific features of the driver. Different drivers differ, for example, in terms of the intensity of the head movement and/or hand movement respectively carried out. In order to avoid inadvertent output of a warning signal, the detection focus can be influenced by taking movement profiles into account in an individual-driver basis. In particular, the number of head movements and/or hand movements is also monitored. It is thus also conceivable for a single flash of the headlights to be performed as a result of a single nod and/or a single wave, while nodding the head several times and/or waving several times causes the headlights to be flashed several times.

Particularly preferably, provision is made that the warning signal is outputted to the target object only if a critical traffic situation between the user and target object is recognized. A critical traffic situation is recognized, for example, if an at least reduced-speed traffic situation at a locality, for example an intersection, is recognized, which situation requires an interaction between the user and target object in order to grant priority. The result in particular is to ensure that a stoppage of vehicles that are at an intersection is avoided. In particular, the vehicles are operated in this context in an autonomous driving mode. A further critical traffic situation can be recognized, for example, on an expressway when the gaze direction detects a target object and, for example, the speed both of the user's vehicle and of the vehicle of the selected target object remains the same over a predefinable time span and it is evident that the target object wishes to change lanes, for example because a directional indicator is activated. By way of a nod and/or a wave, the user can convey to the target object that it can safely change lanes and that the user has recognized the target object's intention. The information is conveyed to the target object in this context preferably via radio, or alternatively as headlight flashing. For example, a single nod and/or a single wave can mean that one headlight flash is emitted; a double nod and/or double wave can cause the information to be conveyed to the target object via radio. The double nod or double wave occurs in this context within a determined time span, so that a double nod or double wave that falls outside the predefinable time span is associated respectively with one emission of a headlight-flash signal.

The apparatus according to the present invention includes a control device that is specifically configured to carry out the method according to the present invention when used as intended. The advantages already recited are thereby obtained.

The signal system according to the present invention includes an apparatus according to the present invention. Here as well, the advantages discussed above may be obtained. The signal system has as a signal generating device, in particular, at least one device that can output an acoustic, optical, and/or electrical warning signal. The signal generating device has, for example, one or more light-emitting means, one or more loudspeakers, and/or a radio module for transferring and optionally receiving warning signals.

Provision is preferably made that the sensor is a laser, radar, sonar, lidar, video-imaging, and/or ultrasonic sensor. The advantage obtained thereby is that both detection of the head movement, gaze direction, hand movement, and/or eyelid movement of the user, and monitoring of the environment, are carried out reliably. The sensor can have one of the sensors listed, or also several of the sensors listed. This ensures that monitoring of the environment occurs, for example, irrespective of the time of day and brightness. A position, a speed, and preferably also an intention of the target object are furthermore thereby detected. "Intention" means here that an identification is made as to whether the target object intends to cross a street or change lanes.

According to a preferred refinement of the present invention at least one further sensor, which is embodied as a microphone, acoustic sensor, switch, or pushbutton, is provided. With the microphone or acoustic sensor it is possible to detect acoustic signals that are emitted by the user, and to infer a triggering command therefrom. The acoustic sensor has the microphone for receiving the acoustic signal and a signal processor that is embodied to recognize predefinable words, for example "yes" or "no." Upon detection by the microphone of a predefined word that is spoken by the user, the signal processor can compare the detected word with the stored words, and recognize a triggering command and send it to the control device. With the switch or pushbutton, the triggering command is detected haptically or via touch.

The vehicle, in particular motor vehicle, according to the present invention may include the signal system according to the present invention. The advantages already recited are thereby obtained.

Further advantages and preferred features and feature combinations are evident in particular from what has been described herein.

The present invention is explained in further detail below with reference to preferred exemplifying embodiments.

BRIEF DESCRIPTION OF THE DRAWINGS

FIG. 3 shows a method for operating the signal system being presented.

DETAILED DESCRIPTION OF EXAMPLE EMBODIMENTS

Figure 1:
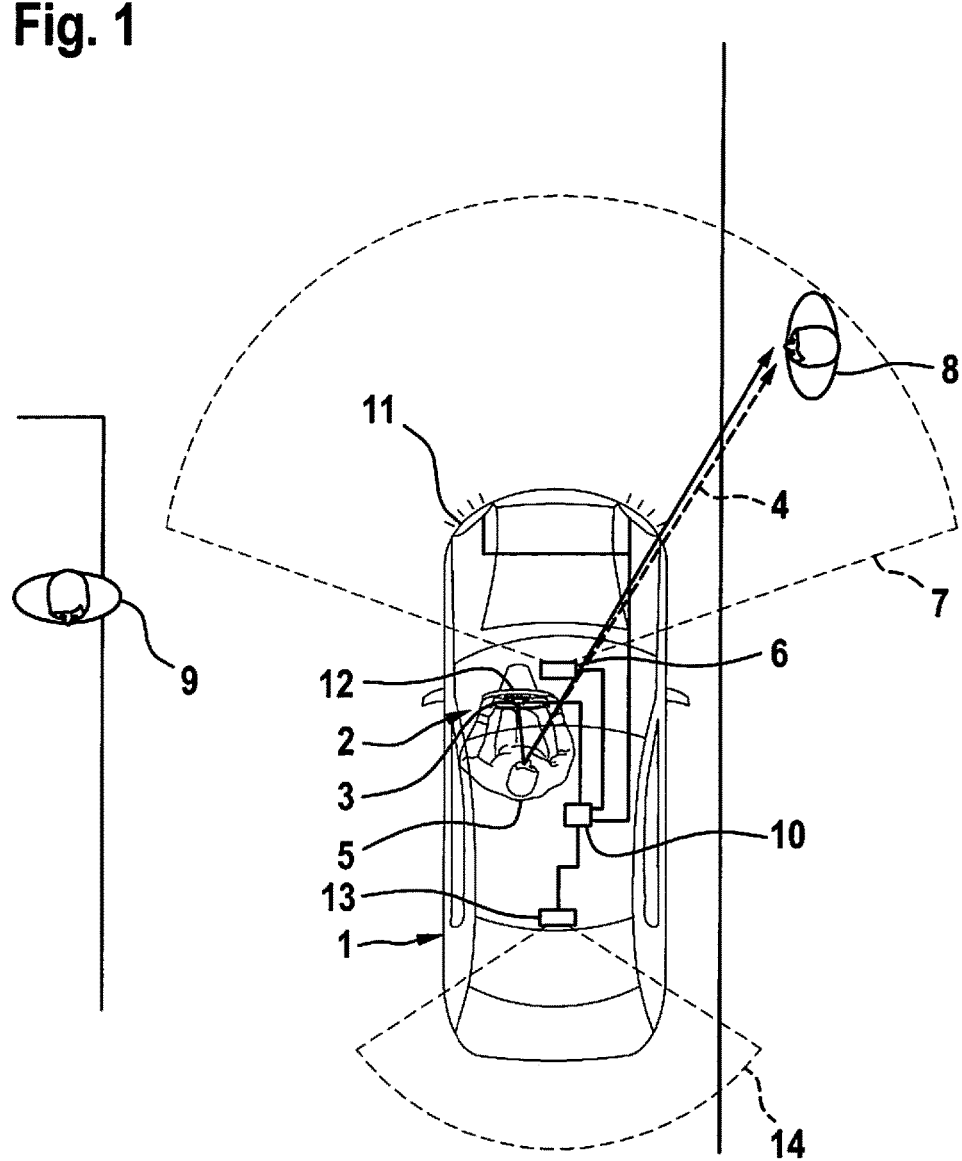
FIG. 1 is a simplified plan view of a motor vehicle having a signal system in accordance with a first exemplifying embodiment.

FIG. 1 shows a motor vehicle 1 having a signal system 2; the proportions shown do not correspond to conditions preferred in reality, and serve merely to improve clarity. Signal system 2 has a first sensor 3 for detecting a head movement, a gaze direction 4, a hand movement, and/or an eyelid movement of a user 5, in particular of a driver of vehicle 1. Signal system 2 furthermore has a second sensor 6 for monitoring an environment 7 of user 5 or of the motor vehicle for possible target objects 8, 9. Signal system 2 additionally has a third sensor 24 (not depicted here) for detecting a voice input of user 5. Signal system 2 furthermore has a control device 10 that evaluates the signals of first sensor 3, of second sensor 6, and of third sensor 24. Control device 10 is connected to a signal generating device 11 that is embodied to output a warning signal into environment 7.

First sensor 3 is preferably embodied as a camera sensor. This detects, in particular, on the one hand gaze direction 4 and on the other hand the head movement, hand movement, and/or eyelid movement of user 5. In order to determine gaze direction 4, first sensor 3 preferably detects the movement and/or position of pupils of user 5. For this, the pupils are illuminated in particular with an infrared radiator, and the gaze direction of user 5 is ascertained on the basis of the head movement or head position and/or the orientation of the pupils in particular with respect to a reflection of the infrared radiator on the retina. Further infrared radiators or sensors 3 are preferably disposed in motor vehicle 1 for further illumination and observation of user 5. In the present case, first sensor 3 is disposed in the region of a combination instrument or a steering wheel 12. Further first sensors are preferably disposed on each side of the interior of motor vehicle 1. In particular, the gaze direction, head movement, hand movement, and/or eyelid movement of user 5 can also be detected in the context of reverse travel. Second sensor 6 is embodied, for example, as a laser sensor or video-imaging sensor. It is embodied in particular in such a way that it can detect a range to target object 8, 9 and a speed of target object 8, 9. Target objects 8, 9 are, for example, pedestrians, other motor vehicles, and/or other traffic participants. Second sensor 6 is embodied in the present case in such a way that it detects a front region of motor vehicle 1. Sensor 6 can be embodied in such a way that it also detects traffic signals, parking spaces, and other traffic-relevant objects (not depicted here). Control device 10 compares the detected gaze direction of user 5 with external environment 7, and if the gaze direction of user 5 is pointing toward one of the possible target objects 8, 9, that target object 8 is designated as a selected target object 8. The same applies if user 5 is driving motor vehicle 1 in reverse, environment 14 being detected by sensor 13 and the gaze direction of the driver being compared with the external environment 14. Third sensor 24 is embodied as an acoustic sensor that has a microphone and a signal processor, the signal processor being embodied in particular to detect words of user 5 and compare them with predefinable words stored in the signal processor. Stored words are, for example, "yes" or "no." Third sensor 24 is preferably disposed in the region of the combination instrument.

For example, if target object 8 is designated as selected target object 8, control is applied to control device 10 in such a way that it outputs a warning signal into environment 7 depending on a detected head movement, hand movement, eyelid movement, and/or voice input of user 5. The warning signal is conveyed to target object 8, for example, via a light flash by way of signal generating device 11, in particular the headlights. Preferably the warning signal is conveyed in directed fashion to target object 8. This is accomplished, for example, by the fact that control is applied to only one of headlights 11, preferably the right one, or the one that is closer to target object 8, 9. It is also possible, for example, to project a crosswalk pattern onto the roadway by way of a projection device (not depicted here) so that the selected traffic participant/pedestrian is informed that he or she can cross the street.

Alternatively, it is also possible to use one sensor 3 in each case to detect the gaze direction, head movement, hand movement, and/or eyelid movement.

Figure 2:
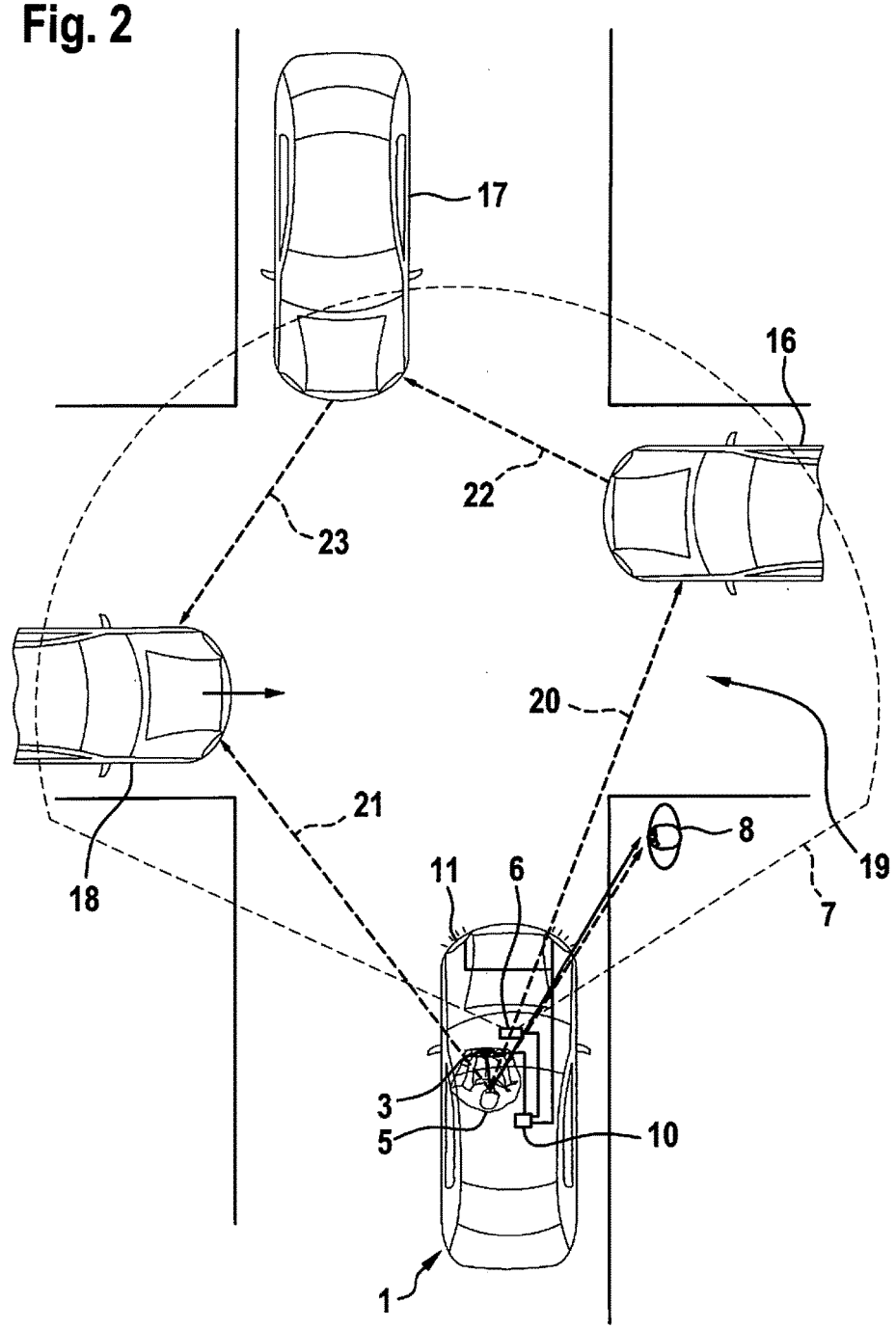
FIG. 2 shows the motor vehicle having the signal system in a critical traffic situation, in accordance with a second exemplifying embodiment.

FIG. 2 shows a critical traffic situation with motor vehicle 1, target object 8, and further possible target objects 16, 17, 18. A critical traffic situation exists in particular when control device 10 recognizes an at least reduced-speed traffic situation at a locality 19, in particular an intersection, which requires an interaction between user 5 and target object 8, 16, 17, 18 in order to grant priority. The granting of priority determines in particular which traffic participant, or which target object 8, 16, 17, 18, is allowed to proceed first. In the present case, user 5 of motor vehicle 1 is looking at target object 8. Further target objects 16, 17, 18 are located in the detection region of sensor 6. Because the direction toward target object 8 is designated as gaze direction 4 of user 5, the control device applies control to signal generating device 11 in such a way that the warning signal is conveyed in targeted fashion to target object 8. The result of this in particular is to prevent the other traffic participants from getting the impression that the emitted warning signal is meant for them. A projection of a crosswalk pattern is therefore preferably projected onto the roadway to target object 8, in particular to a pedestrian, in such a way that target object 8 is informed in visually unequivocal fashion that it is being granted priority with respect to motor vehicle 1. When a target object 8 is designated as the target object, the process of crossing the street is then, for example, tracked by second sensor 6 until target object 8 has crossed the street. For example, the tracking of the process is conveyed acoustically to driver 5 of motor vehicle 1 until the process is concluded.

The traffic situation existing at intersection 19 is such that a traffic flow is maintained only by granting a priority. In particular with motor vehicle 1 and/or another traffic participant in an at least partly autonomous driving mode, the priority signal is conveyed via radio to at least one of target objects 16, 17, 18. The further traffic participant is preferably made aware of the critical traffic situation haptically or acoustically, for example by vibration of the steering wheel, via an optical indication on the combination instrument of motor vehicle 1, or via an acoustic signal.

User 5 directs his or her gaze direction 20 toward target object 16. By way of a head movement, for example a nod, he or she indicates that he or she is granting it priority. Alternatively or additionally, he or she can signal to target object 16 via a hand movement, in particular a wave or a waving gesture with one hand, that he or she is granting it priority. It is also possible for user 5 to wink at target object 16, for example by closing and opening at least one of his or her eyes twice in succession within a predefinable time. It is furthermore possible for user 5 to say a predefinable word, for example "yes," in order to signal to target object 16 that he or she is granting it priority.

Different warning signals are preferably outputted in this context depending on the head movement, hand movement, eyelid movement, and/or voice input of user 5 which is detected. A single nod and/or a single wave in which the hand is moved only once from one side to the other generates, for example, one light flash to target object 16. A double nod and/or a double wave, for example, generates a warning signal that is transmitted via radio, in particular by way of vehicle-to-vehicle communication. In an autonomous driving mode in particular, motor vehicle 1 would remain stationary until target object 16 has exercised its priority. For this, in particular, target object 16, like target object 8 previously, is observed until the process of granting priority is concluded. User 5 then directs his or her gaze direction 21, for example, toward target object 18. He or she indicates to this as well, by way of a head movement, hand movement, eyelid movement, and/or voice input, in particular by way of a nod and/or a wave, that he or she is granting priority to target object 18.

In order to resolve the critical traffic situation it is furthermore necessary for a user (not depicted here) of target object 16 to direct his or her gaze direction 22 toward target object 17 and convey to it that he or she is granting priority to target object 17. The user (not depicted here) of target object 17 preferably directs his or her gaze direction 23 toward target object 18, and the user of target object 17 grants priority to the user of target object 18 by way of a head movement and/or hand movement. Target object 18 is thereby granted priority at intersection 19. That target object 18 is then the first to cross intersection 19. For this, control device 10 or second sensor 6 additionally detects optical signals, for example a directional indicator that is activated, in order to allow the traffic situation to be unequivocally identified.

The direction in which the individual traffic participants wish to turn at the intersection is given particular consideration in this context. If conflicts result which cannot be resolved by simple right-of-way regulation, control device 10 then in particular recognizes a critical traffic situation, and uses the signal system as described above.

FIG. 3 is a flow chart for carrying out the method, in accordance with an exemplifying embodiment. In a first step S1 motor vehicle 1 is in a manual or automated driving mode. In a second step S2 the head movement, gaze direction 4, hand movement, and/or eyelid movement of driver 5 of motor vehicle 1 is detected. It is detected in particular by first sensor 3, which detects gaze direction 4 of driver 5, for example, based on the orientation of the driver's pupils. A voice input of user 5 is furthermore detected by way of third sensor 24. In a third step S3 environment 7, 14 is monitored by way of a second sensor 6. Environment 7, 14 is examined both for traffic signs and further traffic objects, and for possible target objects 8, 9. Target objects 8, 9 in this context are in particular those which are capable of perceiving a warning signal. In a fourth step S4 a control device 10 evaluates the signals detected by sensors 3, 6. In particular, it compares the detected gaze direction 4 with the monitored external environment 7, 14. If gaze direction 4 of user 5 is pointing toward one of the possible target objects 8, 9, that target object 8 is designated as the selected target object 8. On the one hand, the determination of target object 8 can be made based on a predefinable time span during which the gaze direction is directed toward target object 8. On the other hand, the determination of target object 8 can also be made within a shorter time span on the basis of vehicle parameters, for example the speed of motor vehicle 1 and the condition of the road ahead. Detectors of a satellite-assisted navigation system are preferably additionally utilized for this. In a step S5 a determination is made as to whether a match exists between target object 8 and gaze direction 4. If there is no match (N), for example because gaze direction 4 is pointing in a direction in which there is no target object 8, 9, an unequivocal traffic situation is then inferred. The method is then continued with step S4. If control device 10 does ascertain a match between gaze direction 4 and a possible target object 8, 9 (y), target object 8 is then selected. In a sixth step S6 the head movement, hand movement, eyelid movement, and/or voice input of user 5 is detected, and an intention of user 5 is derived therefrom. In particular, a determination is made here as to whether or not user 5 of motor vehicle 1 wishes to grant priority to target object 8. For example, a single and/or repeated nod is evaluated, and the time span between two nodding actions is also evaluated. If two nodding actions occur within a predefinable time span, this double nod will send out a warning signal differing from a single nod. If the time span between two nodding actions exceeds a predefinable limit value, the same warning signal is outputted but in duplicate form, as if only a single nodding action had been carried out. The same applies if a single and/or multiple hand movement or wave is detected. Here as well, the time span between two waves is detected. If two waves are performed within a predefinable time span, a different warning signal is sent out than with a single wave. If the time span between two identical hand movements, for example waves, exceeds a predefinable limit value, the same warning signal is then outputted twice. It is also possible for a warning signal to be outputted only when both a predetermined head movement and a predetermined hand movement are detected. For example, the time span between a head movement and a hand movement, in particular a wave, is ascertained. If the wave and the head movement occur within a predefinable time span, then preferably one warning signal is outputted twice within a short time span, or a different warning signal is outputted than in the context of detection of only a head movement. If the time span between the hand movement and the head movement exceeds a predefinable limit value, the same warning signal is then outputted twice with a longer time interval. In the context of detected eyelid movements, preferably the time span between a first closing and opening of at least one eyelid and a second closing and opening of at least one eyelid of user 5 is evaluated. It is also possible to infer the intention of user 5 from a single opening and closing of at least one eyelid in conjunction with a simultaneous nod. In order to derive an intention from the voice input of user 5, a word detected by third sensor 24, which word is preferably spoken by user 5, is evaluated.

In a seventh step S7 the head movement, hand movement, and/or eyelid movement are compared with stored movement patterns. In particular, it becomes possible thereby to distinguish whether a user 5 wishes to confirm something with a nod, a hand movement, and/or an eyelid movement, or whether a user 5 wishes to refuse something with a head shake, a hand movement, and/or an eyelid movement. In particular, a decision is then made, depending on the movement detected by way of the comparison, as to which warning signal is to be outputted, for example an affirming or refusing acoustic or optical warning signal. The words spoken by user 5 are also compared by way of the acoustic sensor with stored words, so that, for example, a confirmation or a grant of priority is derived from a detected "yes," and a rejection or refusal to grant priority is derived from a detected "no."

In an eighth step S8 the warning signal is outputted on the basis of the detected head movement, hand movement, eyelid movement, and/or voice input. The output of the warning signal is outputted, in particular, in directed fashion to target object 8 so that, in particular, uninvolved traffic participants are not irritated by the warning signal. The warning signal is outputted acoustically, optically, and/or electronically, as already described above. Output of the warning signal is accomplished electronically in particular when both motor vehicle 1 and target object 8 or the further traffic participant each possess an apparatus with which vehicle-to-vehicle communication is possible. The warning signal is displayed, for example, on a combination instrument. Electronic output of the warning signal is thus accomplished on the one hand wirelessly and via radio, and on the other hand electronically, in that it is reproduced electronically on a display screen.

In a ninth step S9 the previously detected traffic situation is monitored until it is concluded. It is concluded, in particular, when a process that was triggered by the head movement, hand movement, eyelid movement, and/or voice input has been carried out. For example, the user of a target object, for example the driver of another vehicle, can him- or herself be advised that he or she can transmit an enabling signal to user 5 of motor vehicle 1 in order to confirm to him or her that the process is concluded for him or her. The user of the target object can previously be made aware thereof haptically or acoustically. As soon as the process is concluded, driving operation is resumed or continued.

It is optionally possible in this context to verify by way of the additionally detected hand movement a previously detected driver intention that was signaled by way of the head movement. With automated motor vehicles it is also possible to send an inquiry to another motor vehicle in order to give priority to the driver of the other motor vehicle or to request priority for oneself.

A situation analysis is set up, in particular, in order to determine a traffic situation. This analysis depends in particular on a speed of motor vehicle 1, on a time during which motor vehicle 1 has been in operation, or on the presence of a traffic light or a right-of-way situation. The situation analysis is carried out in particular by way of the data detected by sensor 6.

What is claimed is:

1. A method for operating a signal system for a vehicle, comprising:
   monitoring a gaze direction of a user by way of at least one first sensor;
   outputting a warning signal depending on the gaze direction detected;
   monitoring, by way of at least one second sensor, an environment of the user for possible target objects, the detected gaze direction of the user being compared with the environment; and
   when the gaze direction of the user points toward one of the possible target objects, designating that target object as a selected target object;
   wherein depending on a triggering command of the user, the warning signal is outputted into the environment for the selected target object.

2. The method as recited in claim 1, wherein at least one of a head movement, a hand movement, an eyelid movement, and a voice input of the user is detected in noncontact fashion as a triggering command.

3. The method as recited in claim 2, wherein the warning signal is outputted when at least one of a nod and a head shake is detected as a head movement of the user.

4. The method as recited in claim 1, wherein the warning signal is outputted at least one of acoustically, optically, and electronically.

5. The method as recited in claim 1, wherein the warning signal is outputted in directed fashion toward the selected target object.

6. The method as recited in claim 1, wherein different warning signals are outputted depending on the triggering command detected.

7. The method as recited in claim 1, wherein the warning signal is outputted to the selected target object only if a critical traffic situation between the user and target object is recognized.

8. An apparatus for operating a signal system for a vehicle, the signal system having at least one first sensor for monitoring a gaze direction of a user, and a signal generating device, the apparatus comprising:
   a control device designed to apply control to the signal generating device, depending on the gaze direction detected, so that the signal generating device outputs a warning signal, wherein the control device is designed to monitor, by way of at least one second sensor, an environment of the user for possible target objects, the detected gaze direction of the user being compared with the environment, and when the gaze direction of the user points toward one of the possible target objects, the control device designates that target object as a selected target object, wherein depending on a triggering command of the user, the warning signal is outputted into the environment for the selected target object.

9. A signal system for a vehicle, comprising:
   at least one first sensor for monitoring a gaze direction of a user;

a signal generating device that outputs a warning signal depending on the gaze direction detected; and a control device designed to apply control to the signal generating device, depending on the gaze direction detected, so that the signal generating device outputs a warning signal, wherein the control device is designed to monitor, by way of at least one second sensor, an environment of the user for possible target objects, the detected gaze direction of the user being compared with the environment, and when the gaze direction of the user points toward one of the possible target objects, the control device designates that target object as a selected target object, wherein depending on a triggering command of the user, the warning signal is outputted into the environment for the selected target object.

10. The signal system as recited in claim 9, wherein the at least one first sensor is at least one of a laser, radar, sonar, lidar, video-imaging, and ultrasonic sensor.

11. The signal system as recited in claim 9, further comprising:

at least one further sensor for detecting a triggering command, the at least one further sensor being one of a microphone, acoustic sensor, pushbutton, or switch.

12. A motor vehicle, comprising a signal system, the signal system including at least one first sensor for monitoring a gaze direction of a user, a signal generating device that outputs a warning signal depending on the gaze direction detected, and a control device designed to apply control to the signal generating device, depending on the gaze direction detected, so that the signal generating device outputs a warning signal, wherein the control device is designed to monitor, by way of at least one second sensor, an environment of the user for possible target objects, the detected gaze direction of the user being compared with the environment, and when the gaze direction of the user points toward one of the possible target objects, the control device designates that target object as a selected target object, wherein depending on a triggering command of the user, the warning signal is outputted into the environment for the selected target object.

* * * * *